UNITED STATES PATENT OFFICE 2,614,029

PURIFICATION OF SILVER NITRATE SOLUTIONS

Jerome A. Moede, New Brunswick, N. J., assignor to E. I. du Pont de Nemours and Company, Wilmington, Del., a corporation of Delaware No Drawing. Application February 21, 1951, Serial No. 212,211

5 Claims. (Cl. 23—102)

This invention relates to the purification of aqueous silver nitrate solutions. More particularly it relates to the removal of contaminating metal ions from aqueous solutions of silver nitrate.

Photographic silver halide emulsions are made by precipating silver halides in an aqueous colloid medium. The aqueous silver nitrate solutions used as the source of the silver ions should be very pure and free from other metal salts in order to obtain optimum photographic properties. The prior art methods for the preparation of such solutions are quite time-consuming and tedious and require a plurality of crystallizations.

In U. S. application Serial No. 125,166, filed November 2, 1949 which has been issued as Patent No. 2,543,792, March 6, 1951, there is described a process of purifying aqueous silver nitrate solutions which comprises (1) passing the aqueous silver nitrate solution into contact with elemental carbon, (2) passing the resulting solution into contact with activated alumina, and (3) filtering the resulting solution through a silver oxide impregnated filter. The foreign metal ions are substantially completely removed and a silver nitrate solution of photographic quality recovered. This process while commercially practical has the disadvantage that the alumina must be replaced or regenerated frequently because it is exhausted rapidly by the acid nature of the silver nitrate solution, and the relatively large quantities of metal impurities which must be removed.

An object of this invention is to provide an improved process for preparing silver nitrate solutions having a high degree of purity. Another object is to provide a simplified process for preparing silver nitrate solutions of good photographic quality. A further object is to provide a process which is free from the disadvantages of the process described in the aforesaid application. A further object is to provide such a process which is economical and can be carried out on a relatively large scale. Still other objects will be apparent from the following description of the invention.

The above objects are accomplished and the disadvantages of prior art silver nitrate purification procedures overcome by the process of this invention which comprises; (a) treating an aqueous solution of silver nitrate which contains other metals and metal ions as impurities, e. g., copper, iron, lead, gold, bismuth, mercury, the "platinum metals," etc., with sufficient silver oxide to attain a pH of at least 6.1 and preferably between 6.1 and 9.0 (the pH attained will, of course, vary with the concentration of the silver nitrate solution), (b) allowing the precipitated metals and metal hydroxides to separate out, (c) removing the silver nitrate solution and (d) passing it into contact with one or more water-passing it into contact with one or more water-insoluble, porous, solid adsorbents at least one of which is a water-insoluble, porous basic adsorbent, e. g., activated alumina or magnesia. The other adsorbent may be elemental carbon including carbon black and activated wood charcoal and preferably is used in fine granular form having particle sizes ranging from $10^{-2}$ to 1 micron.

When two different adsorbents are used it is best to first pass the aqueous silver nitrate solution which is recovered from the silver oxide treatment into contact with the basic adsorbent but the invention is not limited to this order of procedure. The preferred order has the advantage that the elemental carbon adsorbent aids in removing any particles of alumina or magnesia for instance which may be entrained in the solution. It the event the elemental carbon adsorbent treatment is eliminated or the solution recovered is still cloudy or hazy because of the presence of alumina or magnesia particles the solution may be passed through a microporous filter, e. g., a stainless steel microporous material or an inert microporous clay ceramic material or fritted glass.

Step "a" may be advantageously carried out by adding silver oxide to an aqueous solution 3 to 6 molars in silver nitrate which contains other heavy metal salts as impurities until the pH of the solution has been raised above 6.1. The amount of silver oxide used will depend on the pH of the untreated solution which generally is between 0.5 and 3.6. The precipitate formed and any excess silver oxide are then allowed to settle out and the resulting silver nitrate solution is drawn off and subjected to further treatment. It has been determined that this step removes by precipitation as the hydroxides or free metals practically all of the metal impurities which behave as poisons in photographic emulsions and which are normally present in nitric acid and silver bullion.

The silver nitrate solution recovered from step (a) may then be brought into intimate contact with particles or pieces of elemental carbon preferably by passing it through a column packed with same. The amount of carbon may be from 0.02–0.1% by weight of the silver nitrate in the solution to be purified. This treatment removes ions of metals of the "platinum" group, gold, bismuth and mercury and photographically harmful organic impurities remaining after the precipitation step and also filters out precipitated and other solid impurities.

The aqueous silver nitrate solution which is recovered from the carbon treatment may then be brought into intimate contact with particles or pieces of activated alumina or magnesia preferably by passing it through a column packed with same. In general, there should be from 2 to 10% by weight of activated alumina based on the amount of silver nitrate in the original solution. The activated alumina or magnesia are also preferably in fine granular form having an average particle size of 28–100 mesh. It has been determined that this step removes substantially all of the metal ion impurities which remain in the solution.

The aqueous silver nitrate solution recovered from the activated alumina may sometimes contain fine particles of alumina in suspension and they can be removed by any practical method of removing fine particles from solution so that they will not cause spots in the finished films or papers. The removal of the particles can be advantageously accomplished by filtering the solution through a stainless steel filter having an average pore size of 5 microns or less.

After any alumina or magnesia particles have been removed, the pH of the silver nitrate solution can be adjusted to 3.0–3.5 with dilute nitric acid and the solution is then of such high degree of purity that it can be used directly for the precipitation of light-sensitive silver halides in a photographic colloid emulsion.

The invention will be further illustrated but is not intended to be limited by the following examples.

EXAMPLE I

Forty-three liters of an aqueous solution containing 65 kilograms of silver nitrate prepared from C. P. nitric acid and 99.97% silver bullion and having a pH of 0.55 was diluted to 65 liters with distilled water. Three hundred and fifty grams of dry pulverized silver oxide was then added to the resulting solution and the mixture stirred until the pH was raised above 6.1.

The resulting mixture was allowed to settle for 15 minutes and the solution was then passed by suction, in one step, through 20 grams of active carbon, packed on a 6 in. diameter filter, 1400 grams of activated alumina, packed in a 60 mm. diameter column, and a porous stainless steel filter. The carbon had an average particle size of $10^{-2}$ micron, the alumina was 28–48 mesh and the stainless steel filter had an average pore size of 5 microns. The temperature of the solution was 25–35° C. and the suction regulated so that the rate of flow was approximately 250 cc., min. After purification the pH was adjusted to 3.0 with 1N nitric acid and the resulting solution which was of high purity was used to prepare high quality photographic emulsions.

Data from the spectrographic analysis of the silver nitrate solution obtained by the above process are summarized below:

Metal impurity grams per $10^6$ grams silver nitrate

| Pd | Au | Cu | Pb | Bi | Pt | Hg | Ir | Ru | Rh | Na |
|---|---|---|---|---|---|---|---|---|---|---|
| less than 0.04 | less than 0.1 | less than 1.0 | less than 0.5 | less than 0.0025 | less than 0.25 | less than 0.15 | less than 0.02 | less than 0.04 | less than 0.04 | less than 60 |

Summarized below are the results of sensitometric tests on positive type gelatino iodo-bromide emulsions having one mol percent iodide. The control emulsion was prepared from a C. P. grade of silver nitrate commonly used in the manufacture of photographic emulsion and manufactured by the conventional method of repeated recrystallization. The films tested were developed at 68° F. for 3½ minutes in a developer consisting of 0.46 gram N-methyl-p-aminophenol sulfate, 3.4 grams hydroquinone, 28 grams sodium sulfite, 10 grams of the mono-hydrate of sodium carbonate, and 0.44 gram of potassium bromide all diluted up to one liter:

| Test Emulsion | | | Control Emulsion | | |
|---|---|---|---|---|---|
| Rel. Speed | H & D Gamma | Fog | Rel. Speed | H & D Gamma | Fog |
| 52 | 2.88 | .01 | 53 | 2.89 | .01 |

EXAMPLE II

Example I was followed exactly except for the fact that the carbon treatment was entirely eliminated from the process. The resulting silver nitrate solution was of high quality and used directly to make high quality photographic emulsions.

Data from the spectrographic analysis of the silver nitrate solution obtained by the above process are summarized below:

Metal impurity grams per $10^6$ grams silver nitrate

| Pd | Au | Cu | Pb | Bi | Pt | Hg | Ir | Ru | Rh | Na |
|---|---|---|---|---|---|---|---|---|---|---|
| less than 0.05 | less than 0.1 | less than 1.0 | less than 0.5 | less than 0.0025 | less than 0.25 | less than 0.15 | less than 0.02 | less than 0.04 | less than 0.04 | less than 60 |

Summarized below are the results of sensitometric tests on positive type gelatino iodo-bromide emulsions having one mole percent iodide. The control emulsion was prepared from a C. P. grade of silver nitrate commonly used in the manufacture of photographic emulsion and manufactured by the conventional method of repeated recrystallization. The films tested were developed at 68° F. for 3½ minutes in a developer consisting of 0.46 gram N-methyl-p-aminophenol sulfate, 3.4 grams hydroquinone, 28 grams sodium sulfite, 10 grams of the mono-hydrate of sodium carbonate, and 0.44 gram of potassium bromide all diluted up to one liter:

| Test Emulsion | | | Control Emulsion | | |
|---|---|---|---|---|---|
| Rel. Speed | H & D Gamma | Fog | Rel. Speed | H & D Gamma | Fog |
| 62 | 2.85 | .02 | 65 | 2.60 | .01 |

EXAMPLE III

An aqueous silver nitrate solution was treated with silver oxide after the manner described in Example I. The precipitate was allowed to settle as in Example I. The silver nitrate solution was removed and then passed at approximately 250 cc./min. through 1400 grams of activated alumina packed in a 60 mm. column. One liter of the resulting solution was passed through 2 grams of active carbon packed in a 2.5 in. diameter filter and a porous stainless steel filter at 10 cc./min. After purification the pH was adjusted to 3.0 with 1N C. P. nitric acid. The resulting solution possessed very high purity as evidenced by its spectrographic analysis given below:

Metal impurity grams per $10^6$ grams silver nitrate

| Pd | Au | Cu | Pb | Bi | Pt | Hg | Ir | Ru | Rh | Na |
|---|---|---|---|---|---|---|---|---|---|---|
| less than 0.05 | less than 0.1 | less than 1.0 | less than 0.5 | less than 0.0025 | less than 0.25 | less than 0.15 | less than 0.02 | less than 0.04 | less than 0.04 | less than 60 |

EXAMPLE IV

A process was carried out exactly the same as Example III except that the filtration through the porous stainless steel filter was eliminated. The resulting silver nitrate solution possessed a degree of purity identical to that given in Example III.

EXAMPLE V

To 10.5 liters of 9M silver nitrate prepared from C. P. nitric acid and 99.9% silver bullion and having pH 0.5 was added a slurry of silver oxide prepared by direct precipitation from approximately 500 cc. of 3M silver nitrate and an equivalent amount of 3M sodium hydroxide and washed five times by decantation. Distilled water was added to bring the volume of the mixture up to 16 liters and the mixture stirred until the pH rose above 6.1.

The mixture was allowed to settle for 15 minutes and the solution then passed by suction, in one step, through 25 grams of active carbon, packed in a 6 in. diameter filter, 1400 grams of activated alumina packed in a 60 mm. diameter column, and a filter containing 100 grams of the alumina coated with silver oxide on a 90 mm. diameter fritted glass disc impregnated with silver oxide. The carbon and alumina were of the same grade used in Example I. The fritted disc had a maximum pore size of 14 microns. The fritted disc can be impregnated with silver oxide by first saturating it with 1N silver nitrate, then passing 1N sodium hydroxide through it, and finally washing it with distilled water. Alumina can be coated with silver oxide by passing sodium hydroxide solution through it until the pH of the filtrate is greater than 11 and then passing silver nitrate solution through it to precipitate silver oxide on the grains. The material is then washed with distilled water to remove sodium ions and other foreign ions. The silver oxide coated alumina is used exclusively to prevent the silver nitrate solution from dissolving the silver oxide impregnated in the filter by affording exposure to silver oxide before it reaches the filter.

After purification the pH was adjusted to 3.0 with 1N C. P. nitric acid and the resulting solution which was of high purity was used directly to prepare high quality photographic emulsions.

Data from the spectrographic analysis of the silver nitrate solution obtained by the above process are summarized below:

Metal impurity grams per $10^6$ grams silver nitrate

| Pd | Au | Cu | Pb | Bi | Pt | Hg | Ir | Ru | Rh | Na |
|---|---|---|---|---|---|---|---|---|---|---|
| less than 0.15 | less than 0.5 | less than 1.0 | less than 1.5 | less than 0.01 | less than 1.0 | less than 0.3 | less than 0.02 | less than 0.3 | less than 1.0 | less than 60 |

Summarized below are the results of sensitometric tests on X-ray type gelatino iodobromide emulsions having 1.55 mol percent iodide. The control emulsion was prepared from a C. P. grade of silver nitrate commonly used in the manufacture of photographic emulsion and manufactured by the conventional method of repeated recrystallization. The films tested were developed at 68° F. for four minutes in a developer consisting of 5.0 grams N-methyl-p-aminophenol sulfate, 7.5 grams hydroquinone, 60 grams sodium sulfite, 58.5 grams of the monohydrate of sodium carbonate and 4.5 grams of potassium bromide all diluted up to one liter:

| Test Emulsion | | | Control Emulsion | | |
|---|---|---|---|---|---|
| Rel. Speed | H & D Gamma | Fog | Rel. Speed | H & D Gamma | Fog |
| 83 | 2.74 | .01 | 79 | 2.57 | .01 |

This invention has the advantage that it provides a practical process for purifying aqueous silver nitrate solutions on a commercial scale. A further advantage resides in the fact that the first step alone of adding sufficient silver oxide to attain a pH of at least 6.1 removes more than 90% of the metal impurities present in silver nitrate obtained from silver bullion and commercial nitric acid. The use of silver oxide before treatment with alumina and carbon black has the advantage that the alumina does not have to be replenished or regenerated as frequently and a smaller amount of this material can be used. Similarly, a smaller amount of carbon is required by the processes. In some cases where the amount of organic impurities is very small the carbon adsorbent may be eliminated. This reduces raw material costs, handling costs and enables one to reduce the size of the equipment. Yet another advantage resides in the fact that more uniform purified silver nitrate solutions can be made from different lots of solutions treated.

As many widely different embodiments of this invention can be made without departing from the spirit and scope thereof, it is to be understood that the invention is not to be limited except as defined by the claims.

What is claimed is:

1. A process of purifying an aqueous solution of silver nitrate containing small amounts of heavy metal and noble metal impurities which comprises treating said solution with silver oxide to attain a pH of at least 6.1, separating the silver nitrate solution from the precipitate and passing the resulting solution into contact with at least one water-insoluble porous solid adsorbent, at least one of which is an adsorbent taken from the group consisting of alumina and magnesia.

2. A process of purifying an aqueous solution of silver nitrate containing small amounts of heavy metal and noble metal impurities which comprises treating said solution with silver oxide to attain a pH of at least 6.1, separating the solution from the precipitated metals and metal hydroxides and silver oxide and passing the resulting solution into contact with at least one water-insoluble, porous solid adsorbent at least one of which is alumina.

3. A process of purifying an aqueous solution of silver nitrate containing small amounts of heavy metal and noble metal impurities which comprises treating said solution with silver oxide to attain a pH of at least 6.1, allowing the precipitated metals, metal hydroxides and silver oxide to separate out, removing the silver nitrate solution, passing said solution into contact with carbon particles, and bringing the resulting solution into intimate contact with particles of activated alumina.

4. A process for purifying an aqueous solution of silver nitrate containing small amounts of heavy metal and noble metal impurities which comprises treating said solution with silver oxide to attain a pH of at least 6.1, allowing the precipitated metals, metal hydroxides and any silver oxide to separate out, removing the silver nitrate solution, passing said solution into contact with activated alumina and bringing the resulting solution into intimate contact with carbon particles.

5. A process of purifying an aqueous solution of silver nitrate containing small amounts of heavy metal and noble metal impurities which comprises treating said solution with silver oxide to attain a pH of at least 6.1, allowing the precipitated metals, metal hydroxides and any silver oxide to separate out, removing the silver nitrate solution, passing said solution into contact with 0.02 to 0.1% by weight based on the silver nitrate of finely divided active carbon having particle sizes ranging from $10^{-2}$ to 1.0 micron and bringing the resulting solution into contact with from 2 to 10% by weight based on the silver nitrate of finely divided activated alumina having an average particle size of 28–100 mesh.

JEROME A. MOEDE.

No references cited.